(12) United States Patent
Schmidt

(10) Patent No.: US 8,072,225 B2
(45) Date of Patent: Dec. 6, 2011

(54) DIFFERENTIAL POWER DETECTION

(75) Inventor: Frederick J. Schmidt, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 530 days.

(21) Appl. No.: 12/247,543

(22) Filed: Oct. 8, 2008

(65) Prior Publication Data

US 2010/0085059 A1    Apr. 8, 2010

(51) Int. Cl.
*G01R 31/02*     (2006.01)
(52) U.S. Cl. .................. 324/522; 324/503; 324/509
(58) Field of Classification Search .................. 324/522, 324/503, 509
See application file for complete search history.

(56) References Cited

U.S. PATENT DOCUMENTS

| | | | |
|---|---|---|---|
| 4,321,645 A | 3/1982 | Thom |
| 4,908,565 A | 3/1990 | Cook |
| 4,937,462 A | 6/1990 | Recker |
| 5,521,787 A | 5/1996 | Baker |
| 5,784,233 A | 7/1998 | Bastard |
| 5,995,911 A | 11/1999 | Hart |
| 6,356,421 B1 | 3/2002 | Guzman-Casillas |
| 6,518,767 B1 | 2/2003 | Roberts |
| 6,590,397 B2 | 7/2003 | Roberts |
| 7,417,836 B2 | 8/2008 | Bax |

*Primary Examiner* — Vincent Q Nguyen
(74) *Attorney, Agent, or Firm* — Carlson, Gaskey & Olds, P.C.

(57) ABSTRACT

A method of determining a differential power condition includes comparing a voltage across a resistor to a first threshold. The voltage across the resistor is proportional to a difference between a first current and a second current. The method also includes comparing a difference between the first current and the second current to a second threshold. A differential power condition is determined in response to the voltage across the resistor exceeding the first threshold, the difference exceeding the second threshold, or both.

18 Claims, 4 Drawing Sheets

DIFFERENTIAL POWER DETECTION

BACKGROUND OF THE INVENTION

This application relates to power bus faults, and more specifically to a circuit operable to detect power bus faults.

Power buses deliver power from a source to a load. Electrical power buses are conductors insulated from unintended conduction paths used to convey power from a source to a load. Certain conditions, such as chafing, age, or wear, can cause power bus faults, such as undesirable connections to an unintended conductor or return path. Such faults divert power from the power bus causing the amount of power leaving the source to not be equal to the amount of power arriving at the load. A method of detecting faults, called the "Differential Power" or "DP" method, detects a difference in power between source and load and, if the difference is excessive (exceeds a threshold), indicates a fault. The subject of this application is an improved method of implementing the "Differential Power" method of bus fault detection.

The effectiveness of the "Differential Power" method of bus fault detection depends largely upon the accuracy and reliability of a circuit used to implement the method. The more accurately the circuit can determine if there is a power difference, the smaller the fault current can be that the circuit can dependably identify. The "Differential Power" method can therefore be used to detect even small faults, before they cause injury or damage. Reliability, as defined for this application, is the likelihood the circuit will falsely fail to report a bus fault due to a circuit failure.

FIG. 1 schematically illustrates a first, prior art circuit 18a for detecting a bus fault using the "Differential Power" method. The circuit is compatible with transducers 20, 22 that output signals 24, 26, 28, 30 whose current amplitude is proportional to the sensed power flowing through the power bus 16 (see FIG. 3). A current transformer ("CT") is an example of such a transducer. Although current transformers sense current, the current in the power bus in many applications is proportional to the power in the power bus, and therefore a current transformer may be used with the "Differential Power" method. The voltage across resistor 34 is proportional to a difference in current output of the transducers 20, 22. A signal conditioner 40a conditions the voltage input signals 51, 52 to produce a conditioned difference signal 42 suitable for the control module 44 to follow. A control module 44 evaluates an amplitude of the conditioned difference signal 42, and if the amplitude is excessive (exceeds a first threshold), the control module 44 indicates a bus fault.

FIG. 2 schematically illustrates a second, prior art circuit 18b for detecting a bus fault using the "Differential Power" method. The circuit 18b is compatible with transducers 20, 22 that output signals 24, 26, 28, 30 whose current amplitude is proportional to the sensed power flowing through the power bus 16 (see FIG. 3). Signal conditioners 40b-c condition the input signals 24, 26, 28, 30 emanating from the transducers 20, 22, and produce a source current signal 46 and a load current signal 48 suitable for a control module 50 to follow. The control module 50 determines a difference between an amplitude of each of the signals 46, 48, and if the amplitude of the difference is excessive (exceeds a second threshold), the control module 50 indicates a bus fault.

A circuit's reliability is improved by the use of BITE ("Built In Test Equipment"). BITE is circuitry built into a given circuit that verifies if the circuit is still functional. Without BIT ("Built In Test"), the probability of circuit failure is calculated over the life of the product or for the duration of time between scheduled maintenance, at which time the circuitry is tested. However, the reliability of a circuit using BITE is calculated over the period of time between BIT tests, which is often very brief. Thus, the decreased time period between tests offered by BITE significantly increases reliability. A feasible, cost effective method to BIT the resistor 38 of FIG. 1 is not known within the industry. Thus, the circuitry of FIG. 2 can be made very reliable, as can much of the circuitry of FIG. 1, but not the resistor 38 of FIG. 1.

A technique often used in conjunction with BITE is to stimulate (abbreviated "STIM") the circuit to be tested. A STIM signal injects a known signal into the circuitry to be tested. Control circuitry (or software) verifies that the circuit produces the expected output signal while it is stimulated.

The circuit 18a of FIG. 1 stimulates the signal conditioner 40a. Since the difference signal 42 output of the signal conditioner 40a is negligible during normal use while no bus faults exist, there is no way to distinguish a circuit that is failed from one that is correctly reporting no difference current, unless the circuit is stimulated. However, a feasible, cost effective method of stimulating the resistor 34 of FIG. 1 is not known.

The circuit of FIG. 2 does not require stimulation of the signal conditioners 40b-c. Because the output of the signal conditioners 40b-c are equal and non-zero during normal use, while no bus faults exist, the circuit can be verified to be working by verifying that the output values of the signal conditioners 40b-c are equal and non-zero.

However, each of the known circuits 18a, 18b has deficiencies. The circuit 18a of FIG. 1 is less reliable than the circuit 18b because if the resistor 38 of FIG. 1 fails, the circuit 18b could erroneously fail to detect a difference between the source and load current and could therefore erroneously not indicate a bus fault. Also, as discussed above, a STIM signal cannot be used to verify that the resistor 34 is functioning properly.

The circuit 18b of FIG. 2 is inherently less accurate than the circuit 18a of FIG. 1. Each circuit element introduces error, and since the circuit 18b of FIG. 2 has multiple additional signal conditioners 40b-c it can not be made as accurate as that of FIG. 1, all other conditions being equal. Also, because the signal conditioning circuit module 40a of FIG. 1 operates on the difference signal, its error affects only the difference signal, whereas the signal conditioners 40b-c of FIG. 2 operate on source signal 24, 26 and load signal 28, 30 having a larger amplitude than the difference signal of the circuit 18a. Thus, for an error contributed by a given signal conditioning circuit module to the total circuit 18b is many times larger than in FIG. 1.

For example, suppose the source current 24, 26 is 100 Amps and the load current 28, 30 is 99 Amps, resulting in a current difference of 1 Amp. Further, suppose the error of the signal conditioners 40a-c is 1% and all other circuit elements are ideal (0% error). In this example, the circuit 18a of FIG. 1 determines a voltage across resistor 34 corresponding to 1 amp and the signal conditioner 40a processes that signal with ±1% error, potentially introducing an error of 0.01 Amps (1% of 1 Amp). The circuit 18b of FIG. 2 has a ±200% error, as the signal conditioner 40b potentially introduces an error of 1 Amp (1% of 100 Amps), and the signal conditioner 40c potentially introduces an error of 1 Amp (1% of 99 Amps), yielding an overall potential error of 2 Amps (200% of 1 Amp).

SUMMARY OF THE INVENTION

A method of determining a differential power condition includes comparing a voltage across a resistor to a first threshold. The voltage across the resistor is proportional to a difference between a first current and a second current. The method also includes comparing a difference between the first current and the second current to a second threshold. A differential power condition is determined in response to the voltage across the resistor exceeding the first threshold, the difference exceeding the second threshold, or both.

A system for determining a differential power condition includes a first resistor electrically connected to a first input signal, a second resistor electrically connected to the first resistor and electrically connected to a second input signal, and a third resistor. The third resistor is electrically connected to the first resistor, the second resistor, and a common connection of the first input signal and the second input signal. A voltage across the third resistor is proportional to a difference between the first current and the second current. The system also includes a control module operable to determine a differential power condition in response to the voltage across the first resistor exceeding a first threshold, the difference between the first input signal and the second input signal exceeding a second threshold, or both.

A system for determining a differential power condition includes an electric generator associated with a turbine engine of an aircraft and a load. The load is coupled to the electric generator via a power bus. The system also includes a first transducer, a second transducer, and a circuit for detecting a differential power condition. The first transducer outputs a first current having an amplitude proportional to a power flowing in the power bus at a first location associated with the electric generator. The second transducer outputs a second current having an amplitude proportional to the power flowing through the power bus at a second location associated with the load. The circuit for detecting a differential power condition includes a first resistor, a second resistor, a third resistor, and a control module. The first resistor is electrically connected to the first current. The second resistor is electrically connected to the first resistor and electrically connected to the second current. The third resistor is electrically connected to the first resistor, the second resistor, and a common connection of the first current and the second current. A voltage across the third resistor is proportional to a difference between the first current and the second current. The control module is operable to determine a differential power condition in response to the voltage across the first resistor exceeding a first threshold, the difference between the first current and the second current exceeding a second threshold, or both.

DETAILED DESCRIPTION OF THE PREFERRED EMBODIMENT

Figure 1:
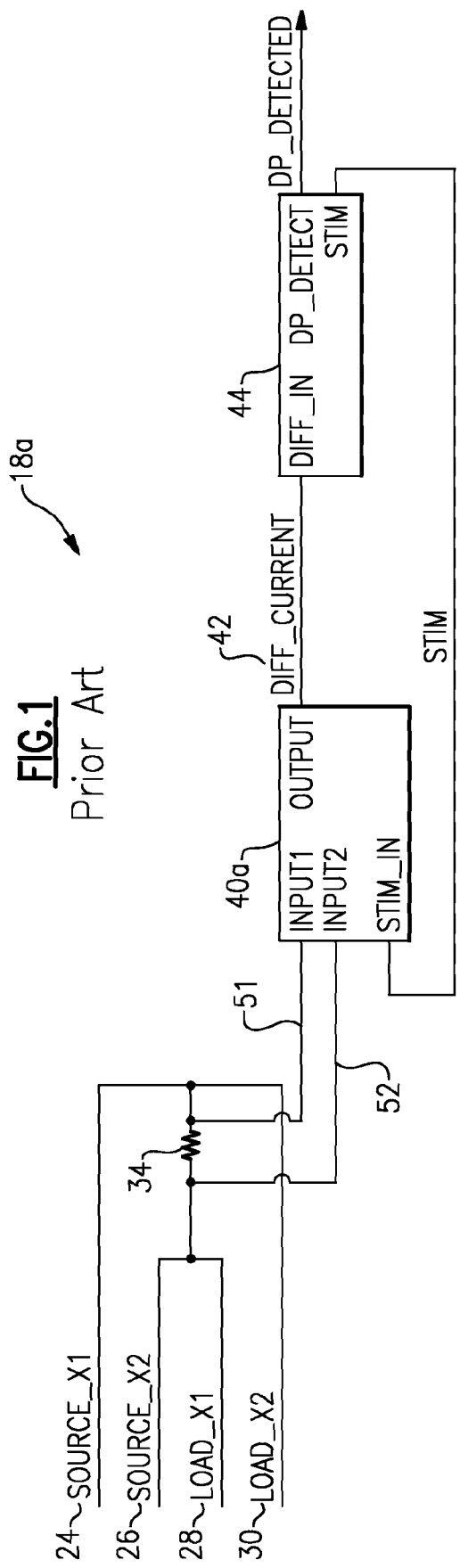
FIG. 1 schematically illustrates a first, prior art circuit for detecting a differential power condition.
Figure 2:
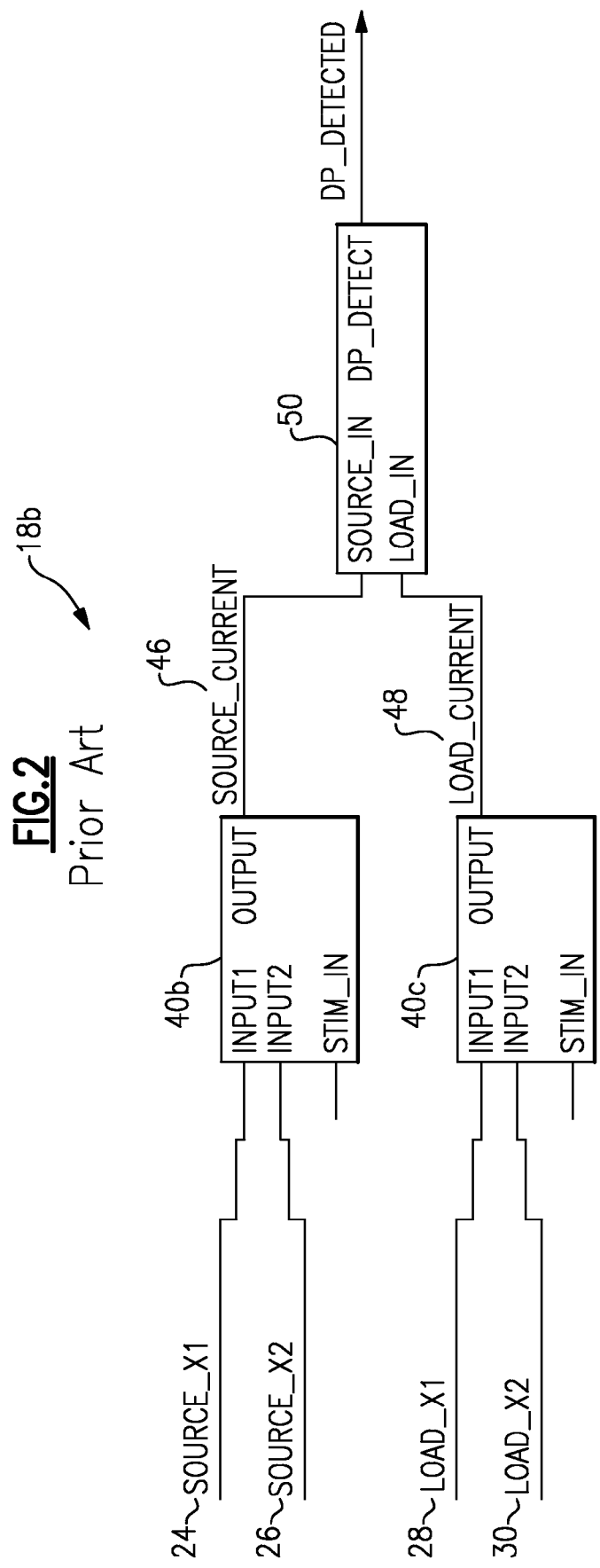
FIG. 2 schematically illustrates a second, prior art circuit for detecting a differential power condition.
Figure 3:
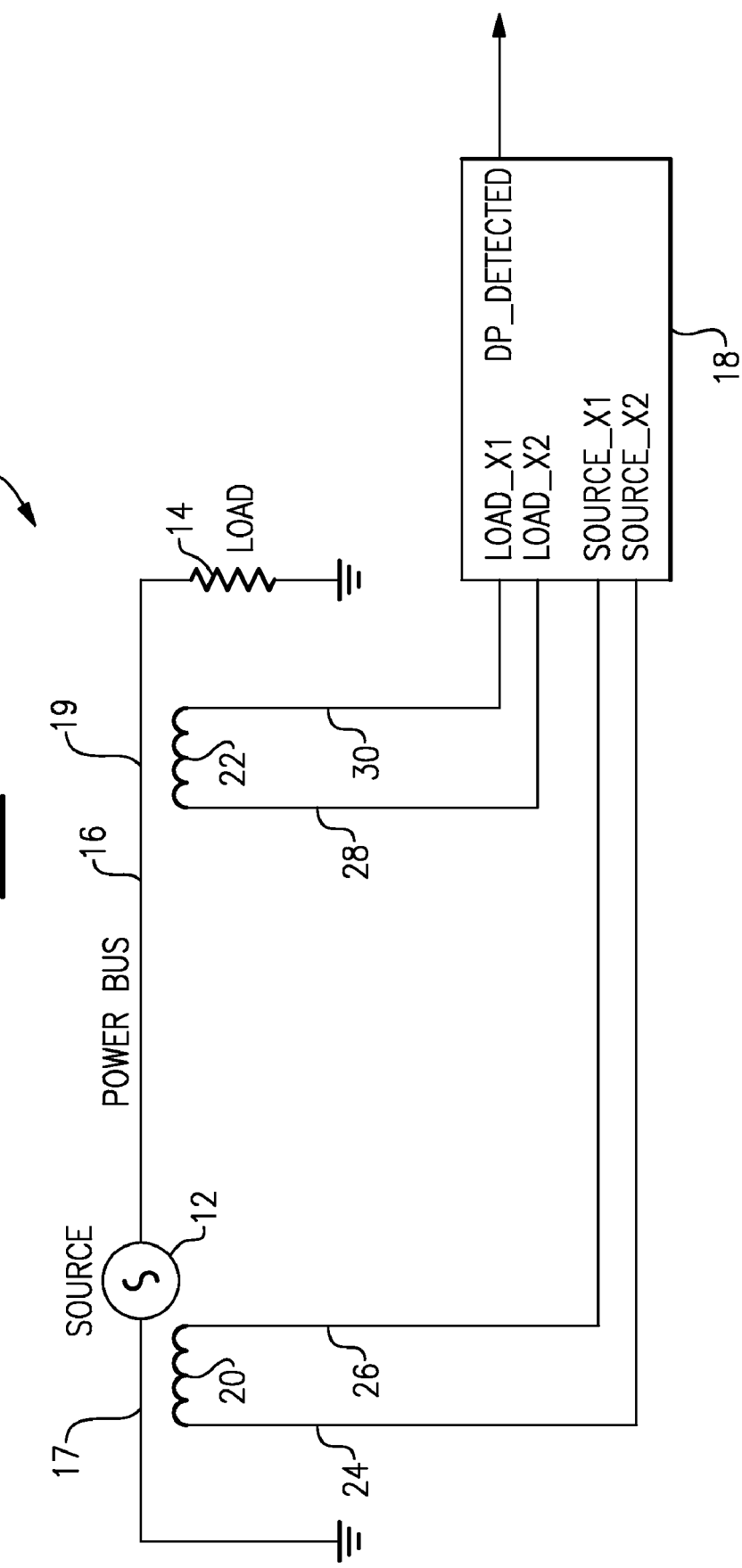
FIG. 3 schematically illustrates a system that includes differential power bus fault protection.

FIG. 3 schematically illustrates a system 10 that includes a power source 12, a load 14, and power bus 16 that conveys power from the power source 12 to the load 14. A first, source transducer 20 outputs a signal 24, 26 that is proportional to a current emanating from the power source 12 into the power bus 16 at a first location 17. A second, load transducer 22 outputs a signal 28, 30 that is proportional to the current flowing through the power bus 16 at a second location 19 into the load 14 (a "line current"). In one example the transducers 20, 22 are current transformers. The signal 24, 26 and the signal 28, 30 are current signals. Of course, other types and quantities of transducers could be used. The system 10 includes a circuit 18 that is operable to detect a differential power condition in response to the transducer signals 24, 26, 28, 30. In one example the system 10 corresponds to an aircraft, the source 12 corresponds to an electric generator associated with a turbine engine, and the circuit 18 is duplicated for each of a plurality of phases of current. Of course, it is understood that the circuit 18 could be used in other applications with other power sources 12 and with other types of power buses.

The circuit 18 includes inputs SOURCE_X1 and SOURCE_X2 that together bring the current signal 24, 26 of the source transducer 20 into the circuit 18. The circuit 18 also includes inputs LOAD_X1 and LOAD_X2 that together bring the current signal 28, 30 of the load transducer 22 into the circuit 18.

Figure 4:
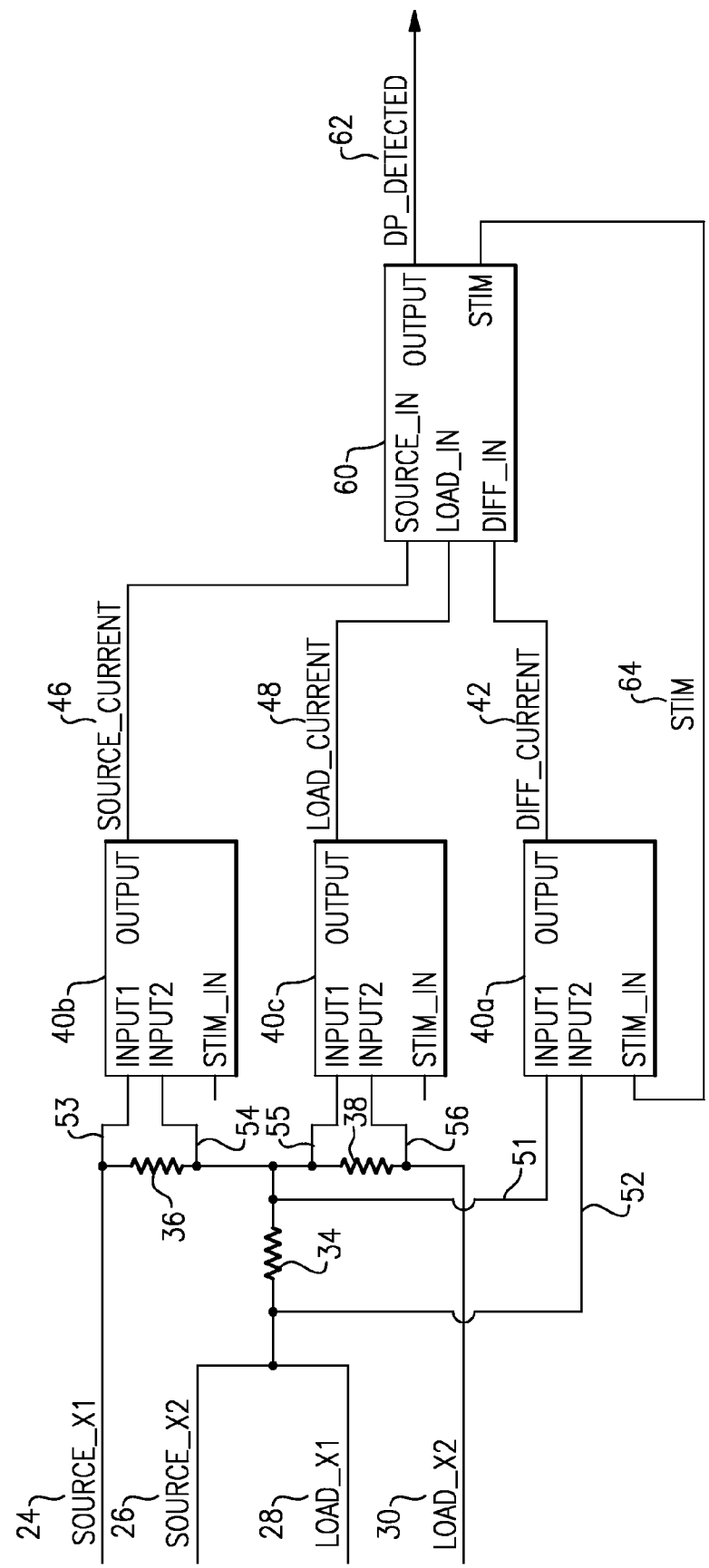
FIG. 4 schematically illustrates an improved circuit for detecting a differential power condition.

FIG. 4 schematically illustrates a circuit 18c operable to detect a bus fault using the "Differential Power" method. The circuit 18c incorporates elements of each of the circuits 18a and 18b. The circuit 18c includes a plurality of resistors 34, 36, 38 that allow the circuit 18c to sense the source current (24, 26), the load current (28, 30), and a difference between the source current and load current, while contributing only a negligible error. As in the circuit 18a, the circuit 18c is compatible with transducers 20, 22 that output current signals 24, 26, 28, 30. In one example the resistor 34 has a resistance that is greater than a resistance of either of the resistors 36, 38. Of course, other resistance values could be used.

The voltage across resistor 34 is proportional to an amplitude of the difference between the source transducer current signal 24, 26 and the load transducer current signal 28, 30, and hence is proportional to a difference between the source and load current at the locations 17, 19. A signal conditioner 40a conditions voltage input signals 51, 52 and provides a difference signal 42. The conditioning performed by signal conditioner 40a may include filtering, buffering, attenuating, or amplifying the signals 51, 52. However, it is understood that other types of conditioning could be performed. A control module 60 evaluates an amplitude of the difference signal 42, and indicates a bus fault if the difference exceeds a first threshold by outputting a fault signal 52 ("DP_DETECTED"). In one example, the control module 60 only indicates a differential power condition if the difference exceeds the first threshold for a predetermined time period.

A voltage across resistor 36 is proportional to an amplitude of the source transducer current signals 24, 26, and hence is also proportional to the source current flowing through the power bus 16 at location 17. A voltage across resistor 38 is proportional to the amplitude of the load transducer current signal 28, 30, and hence is also proportional to the load current flowing through the power bus 16 at location 19. Signal conditioner 40b conditions voltage signals 53, 54 emanating from resistor 36 and provides a source current signal 46 suitable for the control module 60 to follow. Signal conditioner 40c conditions voltage signals 55, 56 emanating from resistor 38 and provides a load current signal 48 suitable for the control module 60 to follow. The conditioning performed by signal conditioners 40a-c may include filtering, buffering, attenuating, or amplifying the signals 53-56. However, it is understood that other types of conditioning could be performed. The control module 60 determines a difference between the signals 46, 48, compares the difference to a second threshold, and indicates a differential power condition by outputting the fault signal 62 ("DP_DETECTED") in response to the difference exceeding the second threshold. In one example, the control module 60 only indicates a differential power condition if the difference exceeds the second threshold for a predetermined time period. The control module 60 may include a microprocessor, analog circuitry, or other implementation technologies. In one example, the control module 60 de-energizes the power bus 16, the power source 12, or both in response to determining a differential power condition.

Although the signal conditioners 40a-c are represented by a single reference numeral, it is understood that they do not need to be identical, and could be designed differently.

The control module 60 may also generate a stimulation signal 64 ("STIM") and evaluates the resulting output from the stimulated circuitry to verify that the circuitry is functional. Although all three signal conditioners 40a-c are illustrated as having STIM inputs, it is understood that the signal conditioners 40b-c may not use their STIM inputs in the circuit 18c, and it is understood that the STIM input is an optional feature for the signal conditioners 40a-c.

The thresholds, timing and filtering applied to the signals 42, 46, 48 for evaluation can be "coordinated" to accommodate differences in characteristics (especially accuracy) of the components of the system 10 (source 12, load 14, power bus 16), the transducers 20, 22, and the components contained in the circuit 18c (resistors 34, 36, 38, signal conditioners 40a-c, and the control module 60). One aspect of the "coordination" could be to apply a larger threshold to the difference of the source and load signals than to the difference signal. That is, the second threshold may be set such that the second threshold is greater than the first threshold. The thresholds as a goal may be set to be as low as the components of the system 10 (source 12, load 14, power bus 16), the transducers 20, 22, and the components contained in the circuit 18c (resistors 34, 36, 38, signal conditioners 40a-c, and the control module 60) will allow without undue risk of false indications.

Another aspect of the "coordination" could be to perform additional filtering of the difference of the source and load result, such that brief transients are filtered from the result to prevent false DP indications. A third aspect of the "coordination" could be "debounce," which is a time delay such that the difference of the source and load signals must exceed a threshold for a continuous time period before a condition is indicated. The details of the coordination are highly dependant on the specific characteristics of the components of the system 10 (source 12, load 14, power bus 16), the transducers 20, 22, and the components contained in the circuit 18c (resistors 34, 36, 38, signal conditioners 40a-c, and the control module 60).

The circuit 18c of FIG. 4 provides a redundancy not present in either of the circuits 18a, 18b. For example, if the resistor 34 of circuit 18a were to fail or become shorted, the circuit 18a could erroneously ignore DP conditions by falsely indicating no difference between the signals 24, 26 and the signals 28, 30. However, the circuit 18c provides a redundancy through signal conditioners 40b-c and signals 46, 48. Also, accuracy is not compromised in the circuit 18c because even though the second threshold may be larger than the first threshold and therefore unable to detect some DP conditions, the first threshold will still detect the DP conditions with full accuracy.

The circuit 18c is able to detect faults early while they are still benign, and yet is highly reliable in that a latent circuitry failure will not cause the circuit 18c to fail to detect a fault. The term "latent failure" refers to when a circuit component fails, but does not cause a system effect until later, perhaps when the effect is critical. An example of a latent failure is a circuit breaker shorting closed, as the breaker failure may have no effect on a system until a circuit associated with the breaker is overloaded and the system relies upon the breaker for protection.

The circuit 18c is widely applicable to applications other than electrical power buses that deliver electrical power. For example, the source 12 could be a source of water, the power bus 16 could be a pipe that delivers water from a water source 12 to a hydro-dynamic load 14, the transducers 20, 22 could be configured to output signals 24, 26, 28, 30 indicative of flow rate, and the circuit 18c could be implemented to indicate a difference in flow rate between locations 17 and 19. Other applications would also be possible.

Suitable transducers must be selected based upon the type of power bus and the application. With the electrical power bus 16 of FIG. 3 and the described aviation application, transducers 20, 22 were used because, for the aviation application described above, the current of the bus 16 is proportional to the power in the bus 16. With other electrical power buses a current transducer may not be sufficient, and a power transducer or power sensing device may be required. With other types of power buses the power sensing device may be required to sense power in other forms such as fluid-dynamic power, radiated power, mechanical power, etc.

For a fluid dynamic power bus, a suitable transducer may sense flow rate. Flow rate is not power, but may be proportional to power. With a power bus that transfers power in the form of steam, it may not be sufficient to sense only flow rate, and may be necessary to sense power, which in this example would be a function of mass flow rate, pressure and temperature.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of determining a differential power condition comprising:
    comparing a voltage across a resistor to a first threshold, wherein the voltage across the resistor is proportional to a difference between a first power bus current and a second power bus current;
    comparing a difference between a first transducer current output by a first transducer and a second transducer current output by a second transducer to a second threshold; and
    determining a differential power condition in response to at least one of the voltage across the resistor exceeding the first threshold, the difference between the first transducer current and the second transducer current exceeding the second threshold, or both.

2. The method of claim 1, wherein the first transducer current has an output amplitude proportional to the first power bus current flowing in a power bus at a first location, and wherein the second transducer current has an output amplitude proportional to the second power bus current flowing in the power bus at a second location.

3. The method of claim 2, wherein the first location is associated with a power source and the second location is associated with a load.

4. The method of claim 3, wherein the differential power condition indicates that an amount of power leaving the source is not equal to an amount of power arriving at the load.

5. The method of claim 3, further comprising:
de-energizing at least one of the power bus and the power source in response to determining a differential power condition.

6. The method of claim 1, further comprising:
determining the first transducer current;
determining the second transducer current; and
determining the difference between the first transducer current and the second transducer current.

7. The method of claim 1, wherein the second threshold is greater than the first threshold.

8. The method of claim 1, further comprising:
assigning values to the first threshold and the second threshold based on characteristics of system and circuit components.

9. The method of claim 1, wherein the step of determining a differential power condition is only performed if at least one of the first threshold and the second threshold is exceeded for a predetermined time period.

10. The method of claim 9, wherein the second threshold is exceeded for a predetermined time period.

11. The method of claim 1, further comprising:
conditioning a signal corresponding to the first transducer current;
conditioning a signal corresponding to the second transducer current; and
conditioning a signal corresponding to the voltage across the resistor.

12. The method of claim 11, wherein the conditioning includes at least one of filtering, buffering, attenuating, and amplifying.

13. The method of claim 12, wherein the condition includes filtering.

14. The method of claim 1, wherein the steps of comparing a difference between the first transducer current and the second transducer current to the second threshold, comparing a voltage across a resistor to the first threshold, and determining a differential power condition are performed for each of a plurality of phases of current.

15. The method of claim 1, wherein the first threshold and the second threshold are non-zero.

16. The method of claim 1, wherein the first transducer and the second transducer detects a power bus flow rate.

17. The method of claim 1, further comprising:
establishing a stimulation signal in a control module; and
verifying whether at least one signal conditioner in communication with the control module is functional based on the stimulation signal.

18. A method of determining a differential power condition comprising:
comparing a voltage across a resistor to a first threshold, wherein the voltage across the resistor is proportional to a difference between a first power bus current and a second power bus current;
comparing a difference between a first transducer current output by a first transducer and a second transducer current output by a second transducer to a second threshold;
determining a differential power condition in response to at least one of the voltage across the resistor exceeding the first threshold, the difference between the first transducer current and the second transducer current exceeding the second threshold, or both;
conditioning a signal corresponding to the first transducer current;
conditioning a signal corresponding to the second transducer current;
conditioning a signal corresponding to the voltage across the resistor;
coordinating the conditioning steps based on characteristics of system and circuit components; and
coordinating a timing of the steps of comparing a difference between a first transducer current and a second transducer current to the second threshold, comparing a voltage across a resistor to the first threshold, and determining the differential power condition based on characteristics of system and circuit components.

* * * * *